United States Patent [19]

Ryan

[11] Patent Number: 5,291,942
[45] Date of Patent: Mar. 8, 1994

[54] MULTIPLE STAGE SORPTION AND DESORPTION PROCESS AND APPARATUS

[75] Inventor: William A. Ryan, Chicago, Ill.

[73] Assignee: Gas Research Institute, Chicago, Ill.

[21] Appl. No.: 66,485

[22] Filed: May 24, 1993

[51] Int. Cl.$^5$ .................................. F25B 17/08
[52] U.S. Cl. .................. 165/104.12; 62/478; 62/480
[58] Field of Search .............. 165/104.12; 62/478, 62/480

[56] References Cited

U.S. PATENT DOCUMENTS

| | | | |
|---|---|---|---|
| 1,873,390 | 8/1932 | Hainsworth | 62/480 |
| 2,088,276 | 7/1937 | Nesselmann et al. | 62/480 |
| 4,452,760 | 6/1984 | Peterson et al. | |
| 4,527,621 | 7/1985 | LeGoff | 165/104.12 |
| 4,696,799 | 9/1987 | Noe | |
| 4,822,391 | 4/1989 | Rockenfeller | |
| 4,848,994 | 7/1989 | Rockenfeller | |
| 4,875,915 | 10/1989 | Rockenfeller | |
| 5,025,635 | 6/1991 | Rockenfeller et al. | |
| 5,079,928 | 1/1992 | Rockenfeller et al. | |

Primary Examiner—Albert W. Davis, Jr.
Attorney, Agent, or Firm—Speckman, Pauley & Fejer

[57] ABSTRACT

A process and apparatus for multi-stage sorption and desorption of process gas using a multiple concentric tube apparatus having a thermal supply gas pass through the central conduit creating a thermal wave passing through a high temperature sorption/desorption salt in the innermost annular compartment desorbing prior sorbed process gas followed by passing the thermal wave to an outer annular compartment which together with heat of sorption of process gas in an inner annular compartment desorbs process gas in the outer annular compartment. The process is useful in heat pumps and gas evaporative cooling cycles.

20 Claims, 2 Drawing Sheets

MULTIPLE STAGE SORPTION AND DESORPTION PROCESS AND APPARATUS

BACKGROUND OF THE INVENTION

1. Field of the Invention

This invention relates to a process and apparatus for multi-stage absorption/adsorption and desorption of a process gas using a multiple concentric tube apparatus wherein a thermal wave passing through a high temperature salt in the process of desorption is directly utilized together with the heat of absorption/adsorption for desorption of absorbed/adsorbed process gas in a direct thermally coupled low temperature salt. The process and apparatus is particularly useful in air conditioning applications.

2. Description of Related Art

Triple tube heat exchangers for transfer of heat to or from a plurality of fluids which flow through the heat exchanger in helical directions through a series of fins, which in combination with the walls, conduct heat from the warmer fluid to the cooler fluid which absorbs the heat and carries it away is known from U.S. Pat. No. 2,703,701.

Annular chemical reactors for exothermic reactions having a central rotatable drum cooled on the inside and having extensions on the outer surface extending into an annular reaction volume defined by an annular outer cooling jacket are taught by U.S. Pat. No. 3,438,742.

Phase change chemical thermal energy storage is known: U.S. Pat. No. 3,960,207 teaches a stacked plurality of ring-like disc shaped containers holding a phase change thermal energy storage material with a thermal exchange fluid passing through the conduit formed by the center of the rings. U.S. Pat. No. 4,250,958 teaches a plastic double tube structure having integral spaced webs between the tubes forming segments which are filled with a phase change thermal energy storage material, the inner tube forming a conduit for passage of a heat transfer fluid.

Use of a shell and tube reactor in the catalytic formation of ammonia with a plurality of catalyst beds arranged to preheat reactants by indirect heat exchange with effluen from the first catalyst bed and subsequent cooled gas flow to the second catalyst bed is taught by U.S. Pat. No. 4,452,760. Multiple shell and tube interchangers for cooling reaction gas streams leaving multicatalytic beds in an ammonia synthesis converter by thermal exchange with incoming feed gases are taught by U.S. Pat. No. 4,696,799.

Sorption and desorption of gaseous refrigerants in a liquid which is then slurried with a particulate solid to form a ligand complex with the heat of the complex-forming reaction being transferred for recovery to heat exchange surfaces at different elevations is taught be U.S. Pat. Nos. 4,822,391 and 4,875,915.

U.S. Pat. No. 4,848,994 teaches a heat exchange system using the cooling created by specific metal salt/ammonia ligand complex compounds which are alternately heated and cooled to alternately desorb and adsorb, respectively, providing energy storage or refrigeration.

Constant pressure staging of a plurality of solid reactant adsorbents of different gaseous reactant vapor pressures wherein heat transfer fluid at one temperature desorbs gases in endothermic reactions and then at a lower temperature adsorbs gases in exothermic reactions with a portion of the heat released during exothermic reactions or a portion of the heat adsorbed during endothermic reaction passed by the heat transfer fluid to a heat exchanger for energy recovery is taught by U.S. Pat. No. 5,025,635. The process and apparatus of the U.S. Pat. No. 5,025,635 patent, based upon circulation of a heat transfer fluid, is suitable for heat actuated heat pumps, thermal compressors and heat pumps activated by mechanical work or pressure.

Discrete constant pressure staging of solid-vapor compound reactors wherein a plurality of solid sorbents each having a different sorption and desorption temperature is each located in a different chamber of a reactor, or in separate reactors, with the exothermic heat of sorption from one chamber being transferred by a heat exchange fluid for use in endothermic desorption in another chamber is taught by U.S. Pat. No. 5,079,928. The process and apparatus taught by the U.S. Pat. No. 5,079,928 patent, based upon circulation of a heat transfer fluid, is useful as heat actuated heat pumps, thermal compressors and heat pumps activated by mechanical work or pressure.

SUMMARY OF THE INVENTION

It is an object of this invention to provide an apparatus and process utilizing direct thermal conduction of timed thermal waves from heat supplied for desorption from a high temperature salt and the heat of sorption by the high temperature salt to drive desorption in a lower temperature salt.

It is another object of this invention to provide an apparatus and process of the above type in which thermal conduction from the high temperature salt to the low temperature salt may be decoupled for a portion of the cycle.

Yet another object of this invention is to provide an improved ammonia absorption air conditioning system.

The above and other objects and advantages are achieved by multi-stage sorption and desorption using a plurality of salts providing sorption and desorption at different temperatures. The terminology "high temperature salt" refers to a salt sorbing and desorbing the particular process gas used at a higher temperature than the "low temperature salt" sorbs and desorbs the process gas used. Process gas is passed in contact with a low temperature salt sorbing the gas at a lower temperature than the gas would be sorbed by a high temperature salt in thermal conduction relation therewith while rejecting the heat of sorption to the external media. Hot thermal supply gas is passed in isolated relation and thermal exchange with the high temperature salt having prior sorbed process gas creating a thermal supply heat wave passing through the high temperature salt from the hot thermal supply gas exchange side to an opposite side in gas isolated thermal conduction relation and thermal exchange with the low pressure salt, thereby desorbing process gas from the high temperature salt. The desorbed process gas is removed from the high temperature salt and passage of the hot thermal supply gas is stopped when the thermal supply heat wave reaches the opposite side and a substantial portion of the sorbed process gas is desorbed from the high temperature salt. The thermal supply heat wave is passed from the high temperature salt opposite side through the low temperature salt having prior sorbed process gas while process gas is passed in contact with the high temperature salt sorbing the process gas at a higher temperature than the low temperature salt. The heat of sorption by the high temperature salt is also passed through the low temperature salt having prior sorbed process gas, the heat from the thermal supply wave and from the heat of sorption by the high temperature salt desorbing process gas from the low temperature salt. The desorbed process gas is removed from the low temperature salt and the process cycle repeated. The multi-stage sorption/desorption process is particularly useful to drive recycle of refrigerant gas in a gas evaporative cooling process.

BRIEF DESCRIPTION OF THE DRAWING

The above and other objects and advantages of the invention will become apparent as this description proceeds taken in conjunction with the drawing wherein.

DESCRIPTION OF PREFERRED EMBODIMENTS

Figure 1:
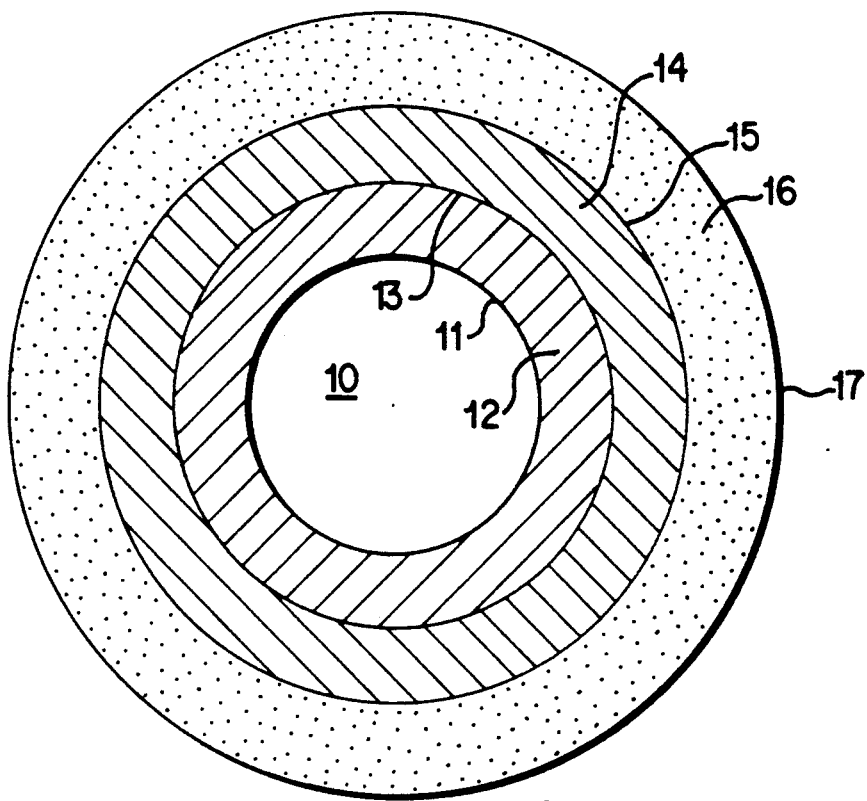
FIG. 1 is a simplified cross section of a reactor for multiple stage sorption/desorption according to one embodiment of this invention.

FIG. 1 shows central thermal supply gas conduit 10 adjacent and in conductive thermal exchange through gas-tight separator wall 11 with innermost annular compartment 12 containing high temperature sorption/desorption salt. Innermost annular compartment 12 containing high temperature sorption/desorption salt is in conductive thermal exchange through gas-tight separator wall 13 with the next outer annular compartment 14 containing lower temperature sorption/desorption salt. While two annular compartments containing different sorption/desorption salts are shown in FIG. 1, it is to be understood that additional annular compartments housing progressively lower temperature sorption/desorption salts may be used. Outer annular compartment gas-tight separator wall 15 is in conductive thermal exchange with thermal exchanger 16 within reactor wall 17.

In the embodiment shown in FIG. 1, a process cycle of multi-stage sorption and desorption according to this invention is achieved by passing process gas in contact with a low temperature salt in outermost annular compartment 14 sorbing the gas by the low temperature salt at a lower temperature than the gas is sorbed by a high temperature salt in the next adjacent inner annular compartment 12 in thermal conduction relation thereto. The heat of sorption in the low temperature salt is rejected through thermal exchanger 16. Hot thermal supply gas is passed through central thermal supply gas conduit 10 in gas isolated relation and in conductive thermal exchange through separator wall 11 with high temperature salt having prior sorbed process gas in innermost annular compartment 12 creating a thermal heat wave passing through the high temperature salt from the hot thermal supply gas exchange side to the opposite side with partition 13 providing gas isolated thermal conduction relation and thermal exchange with the low temperature salt, thereby desorbing process gas from the high temperature salt. The desorbed process gas is removed from the high temperature salt and passage of the hot thermal supply gas through central thermal supply gas conduit 10 is stopped when the thermal heat wave reaches partition 13 and at least a substantial portion of the sorbed process gas is desorbed from the high temperature salt in innermost annular compartment 12. The thermal supply heat wave from the high temperature salt in innermost annular compartment 12 is passed through the low temperature salt having prior sorbed process gas in outermost annular compartment 14 while process gas is passed in contact with the high temperature salt in innermost annular compartment 12 sorbing the process gas at a higher temperature than the low temperature salt. The heat of sorption by the high temperature salt in innermost annular compartment 12 is passed to and through the low temperature salt having prior sorbed process gas in outermost annular compartment 14, the heat from the thermal supply wave and from the heat of sorption by the high temperature salt in innermost annular compartment 12 desorbing at least a substantial amount of sorbed process gas from the low temperature salt in outermost annular compartment 14. The heat is rejected from outermost annular compartment 14 by thermal exchanger means 16. The desorbed process gas is removed from the low temperature salt in outermost annular compartment 14 and the above cycle repeated.

It is seen from the above description that the process is time controlled, that is, hot thermal supply gas is supplied only during desorption from the high temperature salt in inner annular compartment 12 and rejection of heat from low temperature salt is promoted only during sorption by low temperature salt in outer annular compartment 14. It is desired that the hot thermal supply gas heat transfer into the high temperature salt in annular compartment 12 create a sharp thermal supply heat wave passing through the high temperature salt and that the hot thermal supply cease prior to, or no later than, the heat wave reaching the next adjacent outer annular compartment. It is desired that rejection of heat from low temperature salt in outermost annular compartment 14 be promoted only during sorption of process gas by low temperature salt in that compartment.

Suitable salts for use in the process of this invention are those which sorb, by absorption or adsorption, and desorb, at a higher temperature, the process gas desired to be used. The temperatures of sorption and desorption of the high temperature salt are sufficiently higher than those of the next adjacent lower temperature salt to obtain the necessary temperature differential to drive the process. It is preferred that these temperature differentials be greater than about 10° C. Suitable salts providing these temperature differentials for specific process gases may be readily ascertained by one skilled in the art by reference to known properties or by simple experimentation with process gases and salts for which such properties may not have been ascertained.

The multi-stage sorption and desorption process of this invention may be used in conjunction with other process cycles in which the process gas temperature is reduced as part of the overall process cycle. Important applications are in heat pumping, in cooling cycles and in refrigeration. In gas evaporative cooling cycles, ammonia and water are suitable process or refrigerant gases. Use of ammonia refrigerant in a gas evaporative cooling cycle utilizing multi-stage sorption and desorption according to this invention is one important embodiment. Based upon the above desired temperature differentials, suitable salts for such ammonia refrigerant systems are those which sorb and desorb gaseous ammonia at different temperatures, including metal salts selected from those disclosed in U.S. Pat. No. 4,848,994, which is incorporated herein by reference. The salts may be used in the form of beds of solid salts or may be incorporated in a liquid system, such as described in U.S. Pat. No. 4,848,994. The salts may be used in any form which promotes contact between the process gas and the salt.

The hot thermal supply gas passing through central thermal supply conduit 10 may be provided by any suitable heat source, such as, hot gas from any chemical or other supply or waste source, electric heaters, combustion flue gas, and the like. The hot thermal supply gas must have sufficient heat to desorb sorbed process gas from the high temperature salt in high temperature salt compartment 12. The heat is supplied from thermal supply conduit 10 to high temperature salt compartment 12 by conduction through separator wall 11. Separator wall 11 may have expanded heat transfer surfaces on one or both sides to facilitate rapid conduction of the heat from the thermal supply gas to the high temperature salt and to aid in forming a desired sharp thermal supply heat wave passing through high temperature salt compartment 12. Any suitable means to control passage and to cease passage of the hot thermal supply gas through central thermal supply gas conduit 10, as required by the process cycle, may be provided by one skilled in the art. For example, this may be achieved by ignition of a burner or mechanically directing the hot thermal supply gas through central thermal supply gas conduit 10 during the desired time in the cycle for desorbing sorbed process gas from the high temperature salt in the innermost annular compartment 12 adjacent central thermal supply gas conduit 10. Control of the timed intermittent passage of hot thermal supply gas in the process cycle may be preprogrammed or be directed by appropriate thermal measurements and electronic and/or electro-mechanical controls and computer/controller means, as will be readily apparent to one skilled in the art.

The apparatus for multi-stage sorption and desorption according to this invention may be constructed with annular partitions of any suitable heat conductive material, such as steel, or for use with corrosive gases or salts, materials such as stainless steel may be used. The partitions may have expanded surfaces on one or both sides to provide enhanced thermal transfer, if desired.

Heat may be rejected from low temperature salt in the outermost annular compartment 16 by any suitable heat exchanger, such as thermal exchanger 17 in thermal conduction relation with outer annular compartment wall 15. Thermal exchanger 17 may have vertical or horizontal fins over which a coolant gas, such as ambient air, may be directed.

Figure 2:
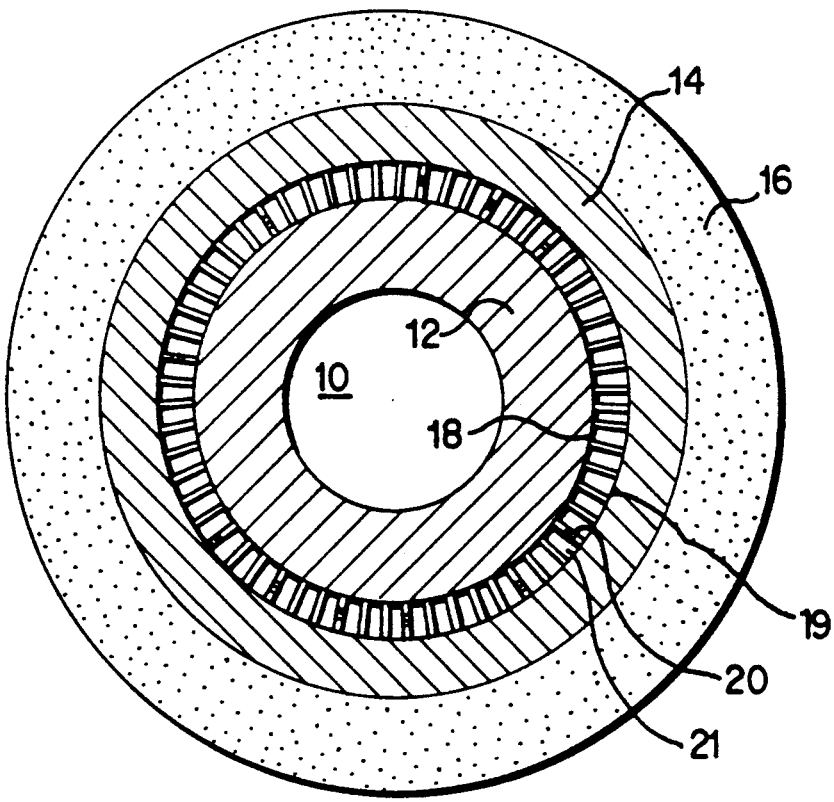
FIG. 2 is a simplified cross section of a reactor for multiple stage sorption/desorption according to another embodiment of this invention.

FIG. 2 illustrates an embodiment of the invention in which the heat transfer between high temperature salt in innermost annular compartment 12 and low temperature salt in outermost annular compartment 14 may be controlled and at least substantially reduced during the portion of the cycle when hot thermal supply gas is passing through central thermal supply gas conduit 10 with high temperature salt in innermost annular compartment 12 desorbing and low temperature salt in annular compartment 14 sorbing. In the decoupling structure shown in FIG. 2, outer wall 18 of high temperature salt innermost compartment 12 is spaced from inner wall 19 of low temperature salt outer compartment 14 with thermal conductive fins 20 between wall 18 and wall 19 and in thermal conductive relation to these walls. To enhance reduction of undesired heat transfer between these compartments, cooling gas, such as ambient air, may be passed through open passages 21 between fins 20 during desired portions of the cycle by any suitable blower and control means as will be apparent to one skilled in the art. When cooling gas is not circulated through open passages 21, fins 20 in conjunction with walls 18 and 19 serve to pass heat by conduction from the high temperature salt in compartment 12 to the low temperature salt in compartment 14.

It is seen that the flow of thermal supply gas in central thermal supply gas conduit 10 to heat high temperature salt annular compartment 12 for process gas desorption, the flow of cooling gas in open air passages 21 to reduce conductive heat transfer from high temperature salt annular compartment 12 to low temperature salt annular compartment 14 during process gas sorption by low temperature salt, and the flow of cooling gas over thermal exchanger 16 to withdraw heat of sorption from low temperature salt annular compartment 14 is desired during the same portion of the process cycle. This simplifies design and control of the reactor for conduct of the process of this invention.

Figure 3:
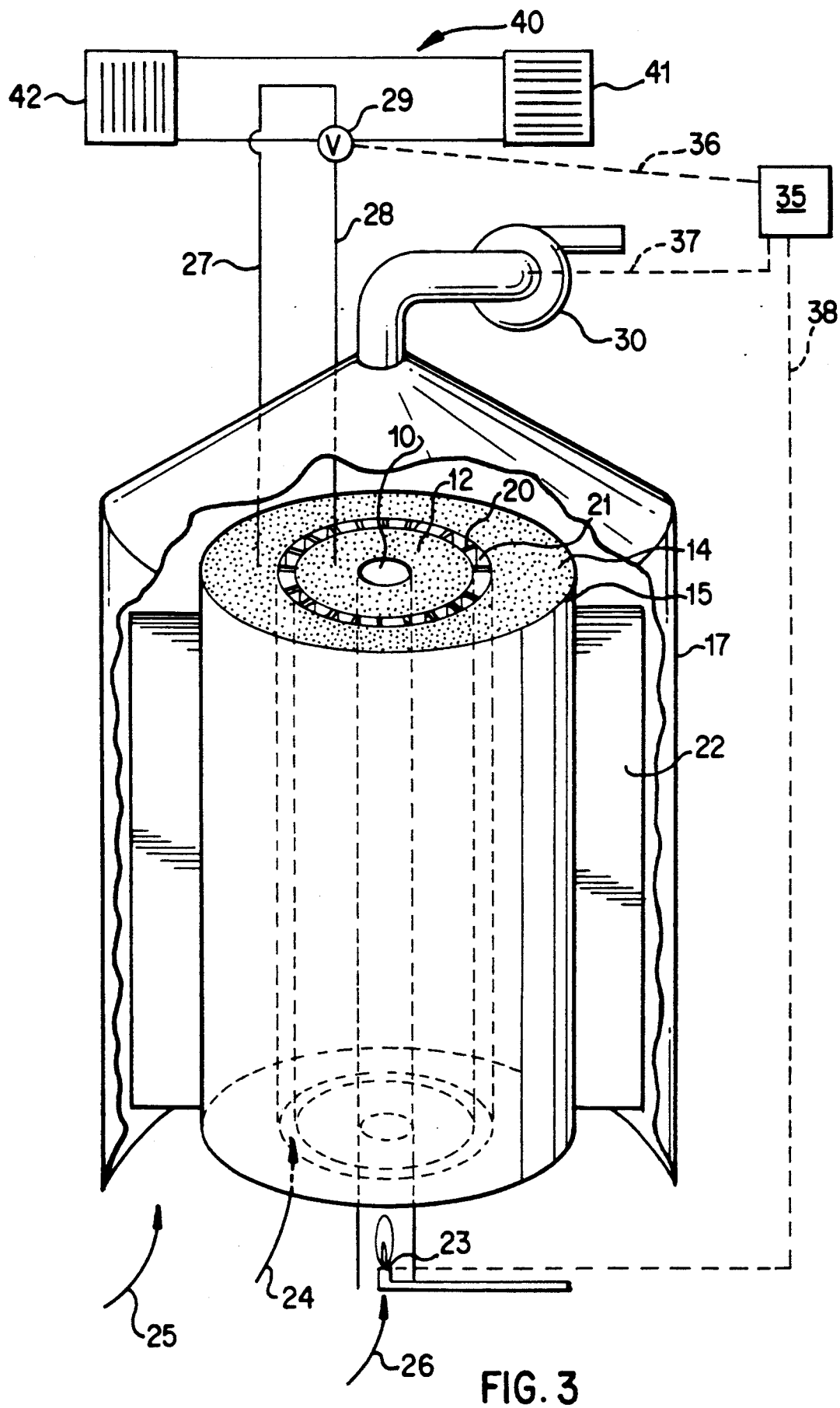
FIG. 3 is a simplified perspective view of the apparatus using the reactor as shown in FIG. 2 in conjunction with a cooling loop.

FIG. 3 schematically shows an apparatus with the reactor configuration as shown in FIG. 2 in conjunction with gas refrigerant cooling apparatus 40. The reactor having vertical cooling fins 22 for thermal exchanger 16, as shown in FIG. 2, is shown encased by reactor side and top wall 17. Vertical cooling fins 22 are spaced around the entire periphery of outer wall 15 of low temperature salt compartment 14. The bottom of the reactor is shown open to ambient air which serves as coolant by passage through passages 21 and over fins 22 and as oxidant for burner 23, as shown by arrows 24, 25 and 26, respectively. The bottom of the reactor may be closed and separate ducts may provide cooling gas and combustion oxidant, if required for open flame burner combustion to provide heat to central thermal supply gas conduit 10. Blower 30 provides desired flow of thermal supply gas from burner 23 through thermal supply gas conduit 10 and cooling gas through cooling passages 21 and over cooling fins 20, as indicated by the arrows, concurrently during the desired portion of the cycle. Process gas is supplied to and removed from low temperature salt compartment 14 by conduit means 27 and is supplied to and removed from high temperature salt compartment 12 by conduit means 28. Conduit means 27 and 28, shown schematically in FIG. 3, may provide direction of the gas flow through the salts in the low temperature and high temperature compartments in a cocurrent or counter current manner, by arrangement as well known in the art. When the gas flows are cocurrent, the temperature gradients will be radial, and when countercurrent, the temperature gradients will be both axial and radial.

The process cycle of the multi-stage sorption/desorption apparatus may be controlled by electro-mechanical means as known to the art, for example in conjunction with gas cooling apparatus 40 as shown in FIG. 3, by computer/control means 35 controlling flow of refrigerant gas to and from sorption/desorption salt compartments. Valve means 29 in the refrigerant gas loop between refrigerant evaporator 41 and refrigerant condenser 42 control the supply and removal of process gas to and from each salt sorption/desorption compartment. Valve means 29 is controlled by computer/controller means 35 through signal/communication line 36. Computer/controller means 35 also controls fuel control to and ignition of burner 23 through signal/communication line 38. Computer/controller means 35 also controls flow of cooling fluid, such as ambient air, through cooling channels 21 and over cooling fins 22 and controls the flow of hot thermal supply gas through central thermal supply gas conduit 10 by activation and deactivation of blower 30 through signal/communication line 37. The process cycle involves activating blower 30 and igniting burner 23 for desorption of process gas from high temperature salt in innermost annular compartment 12 concurrently with sorption of process gas by low temperature salt in outer annular compartment 14 and deactivating blower 30 and extinguishing burner 23 when the thermal supply heat wave reaches the outer edge of innermost annular compartment 12 and sorption of process gas by high temperature salt in inner annular compartment 12 and desorption of process gas from low temperature salt in outer annular compartment 14 commences. Electro-mechanical valves and computer/controller means for control of the multi-stage sorption/desorption apparatus of this invention are readily available and will be apparent to one skilled in the art for use of the multi-stage sorption/desorption apparatus in different applications.

While the invention has been described using two sorption/desorption salts, it is apparent that the process may be conducted with additional sorption/desorption salts in additional annular compartments with their temperatures of sorption/desorption decreasing from the innermost to the outermost annular compartments. While the invention has been described with respect to a single multi-stage sorption/desorption reactor which provides intermittent higher and lower temperature desorbed process gases, if it is desired to provide continuous streams of the different temperature desorbed process gases, it is readily apparent that this may be achieved by operating two such reactors in opposite process sequences.

One important use of multi-stage sorption and desorption according to this invention is in a gas evaporative cooling cycle wherein a refrigerant gas is passed through a condenser condensing it to a liquid refrigerant which is passed to an evaporator wherein the liquid refrigerant boils by thermal exchange with ambient air thereby producing a cooling of the ambient air and the refrigerant recycled driven by thermal energy through sorption and desorption of the refrigerant. This invention provides the improvement of directly utilizing the same thermal supply heat for desorption of refrigerants at different temperatures together with utilization of the heat of sorption of the refrigerant on the higher temperature sorption salt for desorption of refrigerant from the lower temperature sorption salt. A gas evaporative cooling cycle using multi-stage sorption/desorption according to this invention to drive recycle of the refrigerant has a multi-stage sorption/desorption reactor as described above placed in the refrigerant gas recycle line passing refrigerant gas from the evaporator to the condenser to function as a thermal pump for recycle of the refrigerant gas. By the terminology gas, as used with respect to this invention, it is meant to include vapors in a gas stream. Gas evaporative cooling cycles are well known in the art and various means of application of the multi-stage sorption/desorption according to this invention to function as a thermal pump for recycle of the refrigerant are be apparent. Multi-stage sorption/desorption according to this invention is particularly applicable to ammonia and water refrigerants.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

I claim:

1. A process for multi-stage sorption and desorption comprising:

passing process gas in contact with a low temperature salt sorbing said gas at a lower temperature than a high temperature salt in thermal conduction relation thereto and rejecting the heat of sorption;

passing hot thermal supply gas in gas isolated and conductive thermal exchange relation with said high temperature salt having prior sorbed process gas creating a thermal supply heat wave passing through said high temperature salt from a hot thermal supply gas exchange side to an opposite side in gas isolated thermal conduction relation and thermal exchange with said low temperature salt, thereby desorbing process gas from said high temperature salt;

removing desorbed process gas from said high temperature salt;

ceasing passage of said hot thermal supply gas when said thermal supply heat wave reaches said high temperature salt opposite side;

passing said thermal supply heat wave from said high temperature salt opposite side through said low temperature salt having prior sorbed process gas;

passing process gas in contact with said high temperature salt sorbing said process gas at a higher temperature than said low temperature salt and passing the heat of sorption by said high temperature salt to and through said low temperature salt having prior sorbed process gas, heat from said thermal supply wave and from said heat of sorption by said high temperature salt desorbing process gas from said low temperature salt;

removing desorbed process gas from said low temperature salt; and repeating the above cycle.

2. A process for multi-stage sorption and desorption according to claim 1 wherein the temperature differential for sorption/desorption by said high temperature salt and said low temperature salt is at least 10° C.

3. A process for multi-stage sorption and desorption according to claim wherein said hot thermal supply gas is provided by a gas flame.

4. A process for multi-stage sorption and desorption according to claim 1 wherein said passing hot thermal supply gas and said rejecting the heat of sorption from said low temperature salt is effected by activating a single blower during at least a portion of the time period of said desorbing process gas from said high temperature salt.

5. A process for multi-stage sorption and desorption according to claim 1 wherein thermal transfer between said high temperature salt and said low temperature salt is reduced during at least a portion of the time period of said desorbing process gas from said high temperature salt.

6. A process for multi-stage sorption and desorption according to claim 1 wherein said passing hot thermal supply gas, said rejecting the heat of sorption from said low temperature salt, and thermal transfer between said high temperature salt and said low temperature salt is reduced by activating a single blower during at least a portion of the time period of said desorbing process gas from said high temperature salt.

7. In a process for gas evaporative cooling wherein a refrigerant gas is passed through a condenser condensing said refrigerant gas to liquid refrigerant which is passed to an evaporator boiling the liquid refrigerant by thermal exchange with ambient air thereby producing cooling of said ambient air and refrigerant gas recycled driven by thermal energy through sorption and desorption of the said refrigerant gas, the improvement of utilization of at least a portion of the heat of refrigerant gas sorption for refrigerant gas desorption in a multi-thermal staged process comprising;

passing refrigerant gas from said evaporator in contact with a low temperature salt sorbing said refrigerant gas vapor and rejecting the heat of sorption;

passing hot thermal supply gas in gas isolated and conductive thermal exchange relation with said high temperature salt having prior sorbed refrigerant creating a thermal supply heat wave passing through said high temperature salt from a hot thermal supply gas side to an opposite side in gas isolated thermal conductive relation and thermal exchange with said low temperature salt, thereby desorbing refrigerant from said high temperature salt;

removing desorbed refrigerant from said high temperature salt and passing it to said condenser;

ceasing passage of said hot thermal supply gas when said thermal supply heat wave reaches said opposite side of said high temperature salt;

passing said thermal supply heat wave from said high temperature salt opposite side through said low temperature salt having prior sorbed refrigerant;

passing refrigerant gas from said evaporator in contact with said high temperature salt sorbing said refrigerant gas at a higher temperature than said low temperature salt and passing the heat of sorption by said high temperature salt to and through said low temperature salt having prior sorbed refrigerant gas, heat from said thermal supply wave and from said heat of sorption by said high temperature salt desorbing refrigerant from said low temperature salt;

passing desorbed refrigerant gas from said low temperature salt to said condenser; and repeating the above cycle.

8. In a process for gas evaporative cooling according to claim 7 wherein said refrigerant is ammonia.

9. In a process for gas evaporative cooling according to claim 7 wherein the temperature differential for sorption/desorption by said high temperature salt and said low temperature salt is at least 10° C.

10. In a process for gas evaporative cooling according to claim 7 wherein said hot thermal supply gas is provided by a gas flame.

11. In a process for gas evaporative cooling according to claim 7 wherein said passing hot thermal supply gas and said rejecting the heat of sorption from said low temperature salt is effected by activating a single blower during at least a portion of the time period of said desorbing refrigerant gas from said high temperature salt.

12. In a process for gas evaporative cooling according to claim 7 wherein thermal transfer between said high temperature salt and said low temperature salt is reduced during at least a portion of the time period of said desorbing refrigerant gas from said high temperature salt.

13. An apparatus for multi-stage sorption and desorption comprising:

a reactor vessel having a plurality of annular concentric compartments surrounding a gas-tight central passage, the separator between the innermost of said annular concentric compartments and said central passage capable of conductive thermal exchange, the separator between each said compartments being gas-tight and capable of conductive thermal exchange, the outermost wall of the outermost of said annular concentric compartments having a thermal exchange means associated therewith;

means for supplying hot thermal supply gas through said central passage;

means for supplying and removing process gas in desired sequence to and from each of said annular concentric compartments; and each of said annular compartments containing a salt capable of sorbing and desorbing said process gas at a different temperature arranged in a gradient of said sorbing and desorbing temperatures in adjacent compartments from said innermost to said outermost compartment, the salt capable of said sorbing and desorbing at the highest temperature in said innermost of said annular concentric compartments and the salt capable of said sorbing and desorbing at the lowest temperature in said outermost of said annular concentric compartments.

14. An apparatus for multi-stage sorption and desorption according to claim 13 having two said annular compartments.

15. An apparatus for multi-stage sorption and desorption according to claim 13 wherein at least one of said separators has an expanded heat transfer surface on at least one side thereof.

16. An apparatus for multi-stage sorption and desorption according to claim 13 wherein said means for supplying hot thermal supply gas comprises a gas burner.

17. An apparatus for multi-stage sorption and desorption according to claim 13 having spaced walls between at least two said annular concentric compartments, said spaced walls having axially extending thermally conductive fins therebetween forming passageways for passing cooling gas therethrough.

18. An apparatus for multi-stage sorption and desorption according to claim 13 having an outer reactor wall open at the bottom surrounding said apparatus.

19. An apparatus for multi-stage sorption and desorption according to claim 18 having blower means in an upper portion of said outer reactor wall, said blower means capable of drawing said hot thermal supply gas through said central passage and drawing cooling gas over said thermal exchange means on said outermost wall.

20. An apparatus for multi-stage sorption and desorption according to claim 13 wherein the salts in adjacent compartments provide said gradient of said sorbing and desorbing temperatures in said adjacent compartments to be at least 109° C.

* * * * *